(12) United States Patent
Philipp (10) Patent No.: US 10,144,595 B2
(45) Date of Patent: Dec. 4, 2018

(54) BUFFER DEVICE

(71) Applicant: Rotzinger AG, Kaiseraugst (CH)

(72) Inventor: Kurt Philipp, Grenzach-Wyhlen (DE)

(73) Assignee: Rotzinger AG, Kaiseraugst (CH)

(*) Notice: Subject to any disclaimer, the term of this patent is extended or adjusted under 35 U.S.C. 154(b) by 0 days.

(21) Appl. No.: 15/562,657

(22) PCT Filed: Mar. 30, 2016

(86) PCT No.: PCT/EP2016/056941
§ 371 (c)(1),
(2) Date: Sep. 28, 2017

(87) PCT Pub. No.: WO2016/156415
PCT Pub. Date: Oct. 6, 2016

(65) Prior Publication Data
US 2018/0105370 A1    Apr. 19, 2018

(30) Foreign Application Priority Data
Mar. 31, 2015 (CH) .......................... 454/15

(51) Int. Cl.
*B65G 47/51* (2006.01)
*B65G 1/04* (2006.01)
(Continued)

(52) U.S. Cl.
CPC ............ *B65G 47/5113* (2013.01); *B65G 1/04* (2013.01); *B65G 47/5109* (2013.01);
(Continued)

(58) Field of Classification Search
CPC ...... B65G 1/04; B65G 1/0407; B65G 1/0435; B65G 1/06; B65G 1/127; B65G 47/5109;
(Continued)

(56) References Cited

U.S. PATENT DOCUMENTS 2,536,756 A * 1/1951 Lopez .................. A21B 3/07
198/347.3
4,220,236 A * 9/1980 Blidung ............ B65G 47/5154
198/347.3
(Continued)

FOREIGN PATENT DOCUMENTS

DE          370578 C      3/1923
DE      25 10 028 A1     9/1976
(Continued)

OTHER PUBLICATIONS

International Search Report dated Jun. 17, 2016 in PCT/EP2016/056941 filed Mar. 30, 2016.

*Primary Examiner* — Gene O Crawford
*Assistant Examiner* — Keith R Campbell
(74) *Attorney, Agent, or Firm* — Oblon, McClelland, Maier & Neustadt, L.L.P.

(57) ABSTRACT

A buffer device for temporary storage and flow control in a product conveying system includes a plurality of vertically movable product holders at an inlet end and outlet end, and an elevator system for placing product holders in a conveying plane of the conveying system and vertically moving the product holders. The elevator system preferably includes a chain loop at the inlet end and a chain loop at the outlet end, both of which are equipped all around with product holders, and the chain loops can move in opposite directions.

11 Claims, 11 Drawing Sheets

(51) Int. Cl.
  *B65G 47/57*   (2006.01)
  *B65G 47/64*   (2006.01)
  *B65G 1/127*   (2006.01)

(52) U.S. Cl.
  CPC ........... *B65G 47/57* (2013.01); *B65G 47/643* (2013.01); *B65G 1/127* (2013.01); *B65G 2201/0202* (2013.01)

(58) Field of Classification Search
  CPC ............ B65G 47/5113; B65G 47/5118; B65G 47/57; B65G 47/643; B65G 47/5122; B65G 47/5127; B65G 47/5131; B65G 2201/0202
  USPC ................................................ 198/347.1, 435
  See application file for complete search history.

(56) References Cited

U.S. PATENT DOCUMENTS

| | | | |
|---|---|---|---|
| 4,499,987 A | 2/1985 | Long | |
| 4,964,498 A * | 10/1990 | Klingl | B65G 47/5113 198/347.1 |
| 5,176,242 A | 1/1993 | Wegscheider | |
| 5,203,256 A * | 4/1993 | Mueller | A21C 13/02 126/281 |
| 5,253,743 A * | 10/1993 | Haas, Sr. | A21C 15/00 198/347.1 |
| 5,529,165 A | 6/1996 | Shupert | |
| 6,250,454 B1 * | 6/2001 | Douglas | B65G 47/5113 198/347.1 |
| 7,073,657 B2 * | 7/2006 | Langenegger | B65G 47/5131 198/460.1 |
| 8,770,385 B2 * | 7/2014 | Hannessen | B65G 17/123 198/607 |
| 2004/0065523 A1 | 4/2004 | Lichti et al. | |

FOREIGN PATENT DOCUMENTS

| | | | |
|---|---|---|---|
| DE | 40 13 687 A1 | 10/1991 | |
| EP | 1 243 532 A1 | 9/2002 | |
| EP | 1645529 A1 * | 4/2006 | B65G 47/57 |
| FR | 2 008 956 A1 | 1/1970 | |
| GB | 2 257 890 A | 1/1993 | |
| WO | 01/76985 A1 | 10/2001 | |
| WO | 03/080483 A1 | 10/2003 | |
| WO | 2015/015439 A1 | 2/2015 | |

\* cited by examiner

BEST AVAILABLE IMAGE

BUFFER DEVICE

The invention relates to a buffer device according to the preamble of claim 1.

To enable compensating for brief interruptions and asynchronous movements in a product flow of packaged or unpackaged piece goods, without any product loss occurring, a buffer device is required which can temporarily store products according to the so-called "first in/first out" principle. Temporary storage may also be desirable in order to prolong the time between production and packaging, for example if a longer cooling time is required.

The use of spiral storage devices for such tasks is known, but this approach requires a great deal of floor space, and often cannot handle unpackaged foods.

Therefore, the problem addressed by the invention is that of conceiving a buffer device which can be inserted with a small footprint at a suitable location in the product flow, and which can temporarily store both packaged and unpackaged piece goods according to the first in/first out principle.

According to the invention, this is achieved by a buffer device which is distinguished by the characterizing features of claim 1.

A preferred embodiment of the invention is described below with reference to the accompanying drawings, wherein:

FIG. 17 shows an enlarged view of FIG. 15, FIGS. 18-23 show schematic representations of different transfer options.

The buffer device shown in FIGS. 1-6 is intended to be inserted at any point in a product conveying system to temporarily store incoming products P and/or to regulate their flow. It primarily consists of a paternoster-type elevator system 1 equipped with product holders 3 on the inlet side, and an identical elevator system 2 equipped with product holders 4 on the outlet side. The elevator systems consist of circulating chain loop pairs to which the product holders are fastened. Both circulating chain loop pairs are individually driven by continuous shafts 5, which are each fitted with two sprockets 6 and a servo motor 7. These drive shafts are located at the bottom. At the top, the chain loop pairs return via supported shafts 8 and sprockets 9 situated on the same.

Figure 1:
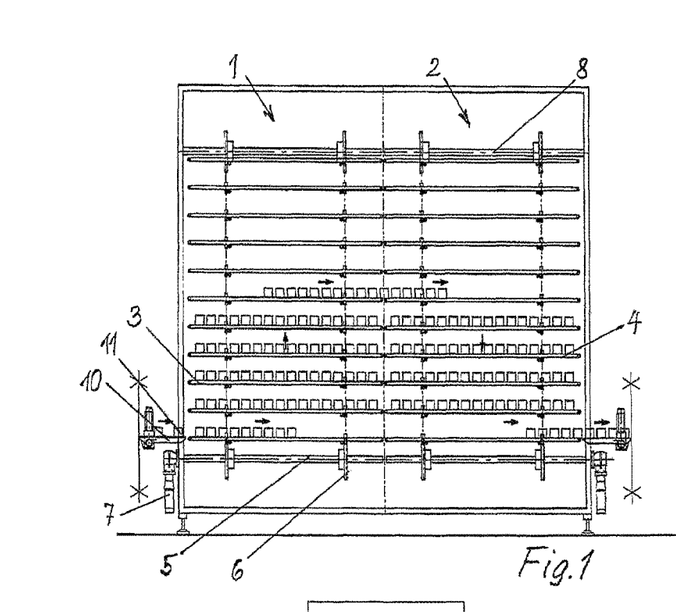
FIG. 1 shows a schematic side view of a buffer device connected within a conveying path.
Figure 2:
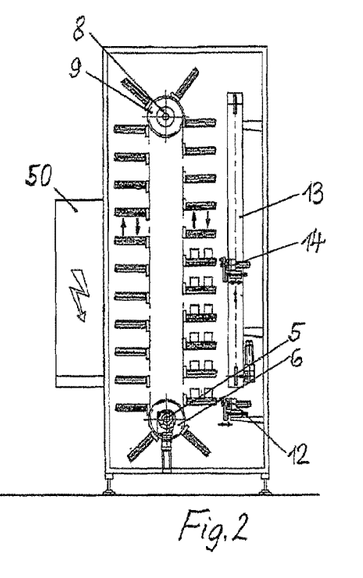
FIG. 2 shows a front view of the buffer device shown in FIG. 1, in the conveying direction.
Figure 3:
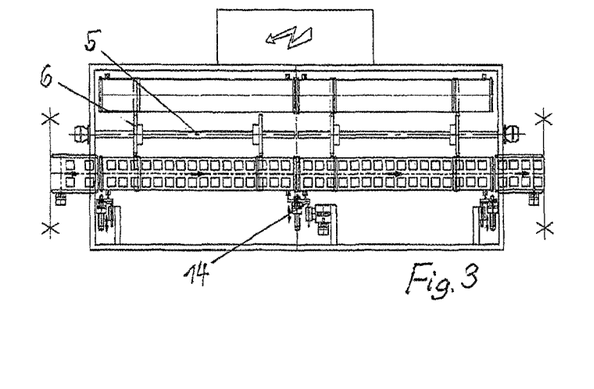
FIG. 3 shows a plan view of the buffer device shown in FIG. 1.

The products holders are moved by the chain loop pairs on one side from bottom to top, and on the other side from top to bottom. In the arrangement on the inlet end, the product holders moving from bottom to top are in the conveying path 10. In the arrangement on the outlet end, the chain pairs move in the opposite direction such that the product holders moving from top to bottom are located in the conveying path.

The product holders are designed as conveyors, typically as conveyor belts, toothed belt conveyors, mesh conveyors, roller conveyors, etc. As such, it is possible to group the incoming products 11 on a conveyor situated in the inlet plane without backup pressure, and to then stock the same higher up by means of the chain loop on the inlet end in the event that the process on the outlet end has been delayed or halted.

At this point, it is necessary to be able to convey this product group from the product holders of the chain loop on the inlet end up to a product holder of the outlet end chain loop with a corresponding height. The product group can be transferred from the inlet end chain loop to the outlet end chain loop inside the buffer at the same time that the product inlet and outlet occurs.

For the discharge of the product groups from the buffer, the same are positioned in the outlet plane by the outlet end chain loop, and then conveyed out.

The product holders designed as conveyors are configured with stationary drives 12 at the inlet and outlet in the lower conveying plane, wherein these can drive the respective product holders. For this purpose, these drives are equipped with centering- and coupling devices which make it possible to always dock and drive the conveyor of the next product holder. The product holders designed as conveyors can be driven on the inlet and outlet ends at individually different speeds.

Figure 4:
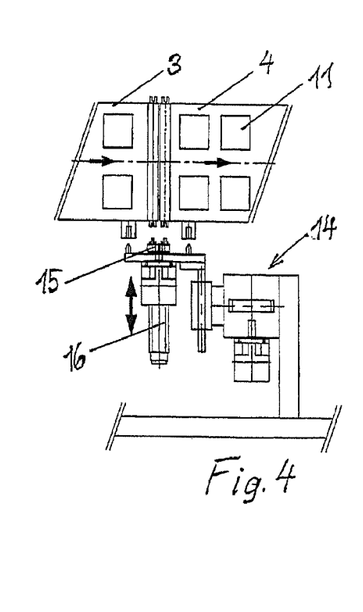
FIG. 4 shows a detailed view of the drive of the product holders.
Figures 5, 6:
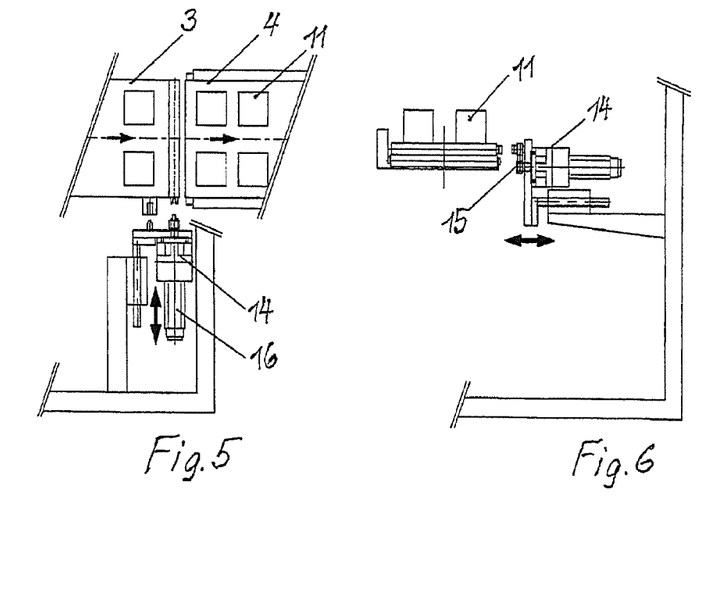
FIG. 5 shows a detailed view of an alternative drive configuration.
FIG. 6 shows a detailed side view of the arrangement according to FIGS. 4 and/or 5.

A servo-controlled central lifting column 13 which can position a carriage 14 vertically at the required level is included for the product group transfer inside the buffer from the inlet end chain loop to the outlet end chain loop. A centering- and coupling device 15, shown in detail in FIGS. 4 and 6, is constructed on this vertically displaceable carriage, in combination with a servo motor 16 with an overdrive device. As such, it is possible with one drive to drive both conveyors of the corresponding product holders on the inlet end chain loop and also on the outlet end chain loop in a synchronized manner.

Alternatively, it is also possible to separately drive the two product holders by means of, in each case, one device as shown in FIG. 5.

The described arrangement results in many advantages. The buffer can be easily integrated into an existing conveyor line without any axial offset. The buffer has a small base area and buffers at the height which is mostly present. The possibility of bypassing in the lower conveying plane is systematically included, by simply halting the conveyors vertically at this level and thereby carrying out the product flow under the buffer.

The product is only conveyed, and neither pushed nor backed up. The product can be handled in a single path or in multiple paths.

Figure 7:
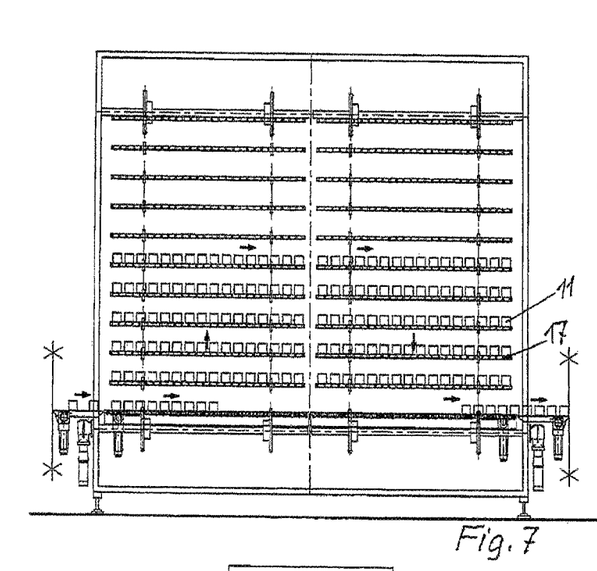
FIG. 7 shows a side view of an alternative embodiment of a buffer device.
Figure 8:
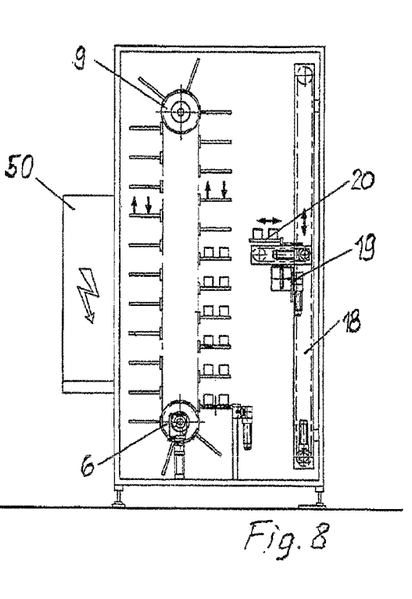
FIG. 8 shows a front view of the embodiment shown in FIG. 7.
Figure 9:
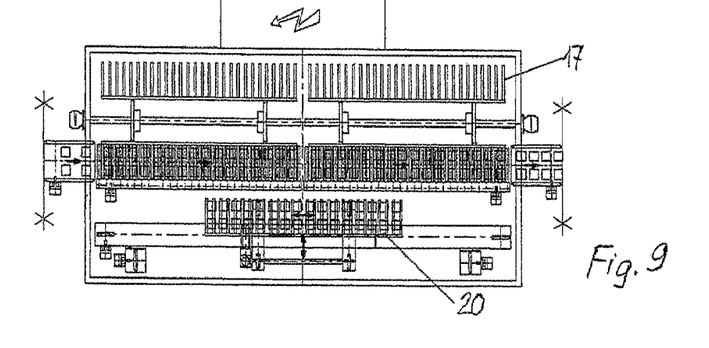
FIG. 9 shows a plan view of the embodiment shown in FIG. 7.
Figure 10:
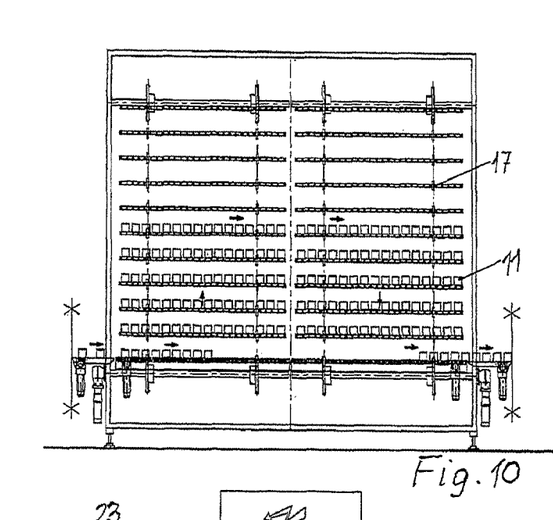
FIG. 10 shows a side view of a further alternative embodiment of a buffer device.
Figure 11:
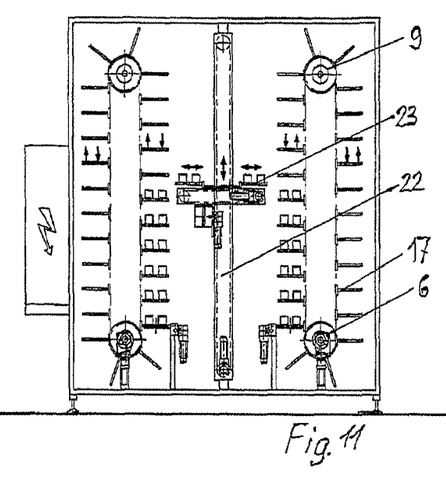
FIG. 11 shows a front view of the embodiment shown in FIG. 10.
Figure 12:
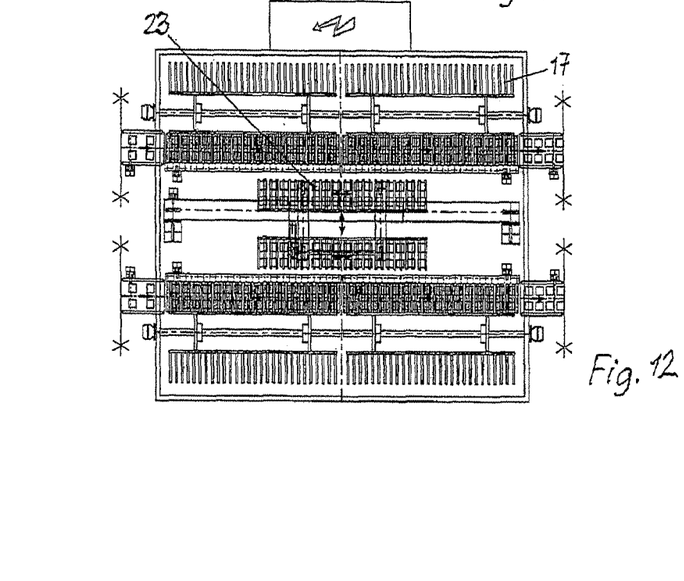
FIG. 12 shows a plan view of the embodiment shown in FIG. 10.
Figure 13:
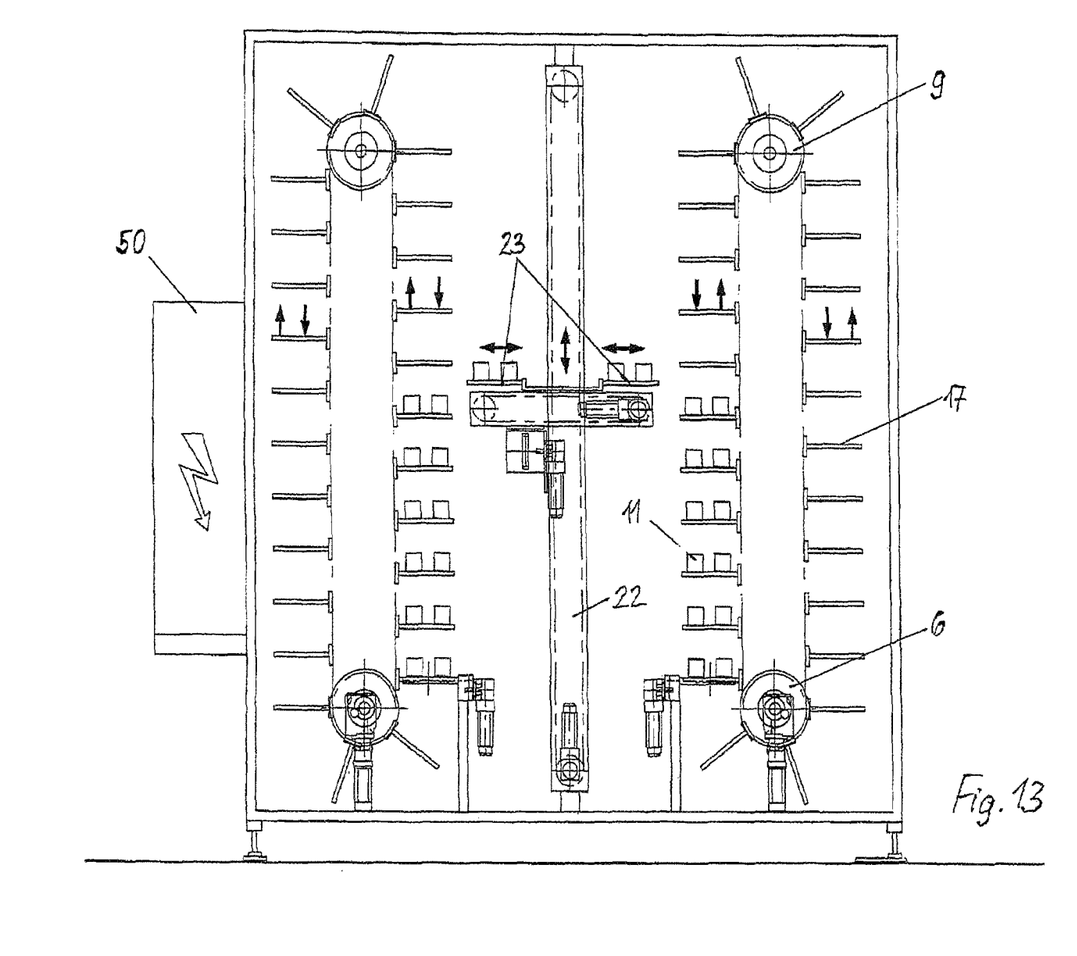
FIG. 13 shows an enlarged view of FIG. 11.
Figure 14:
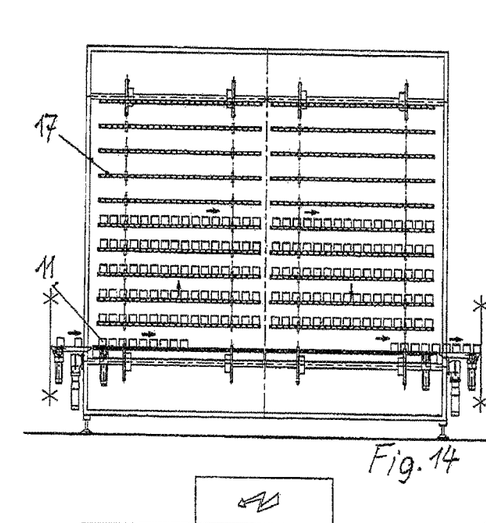
FIG. 14 shows a side view of a further alternative embodiment of a buffer device.
Figure 15:
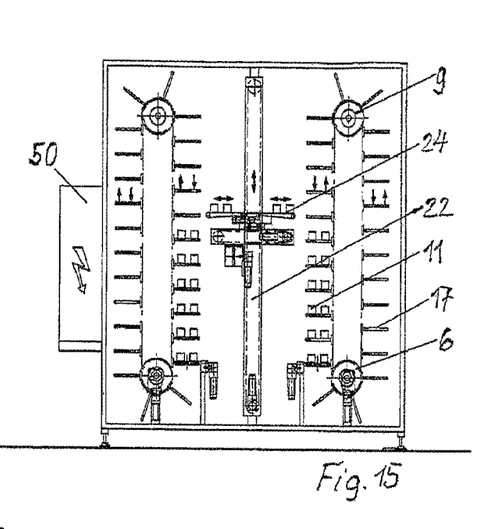
FIG. 15 shows a front view of the embodiment shown in FIG. 14.
Figure 16:
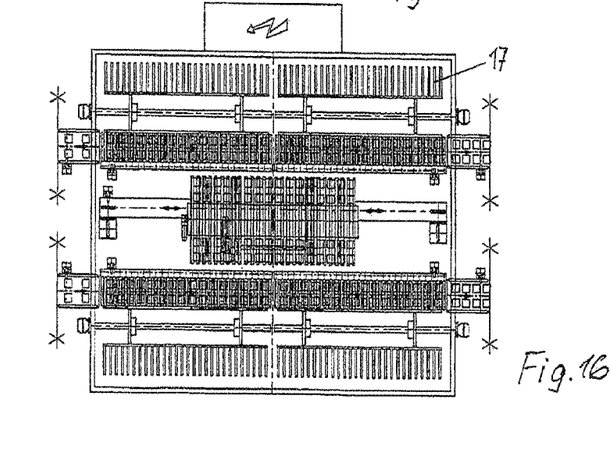
FIG. 16 shows a plan view of the embodiment shown in FIG. 14.
Figure 17:
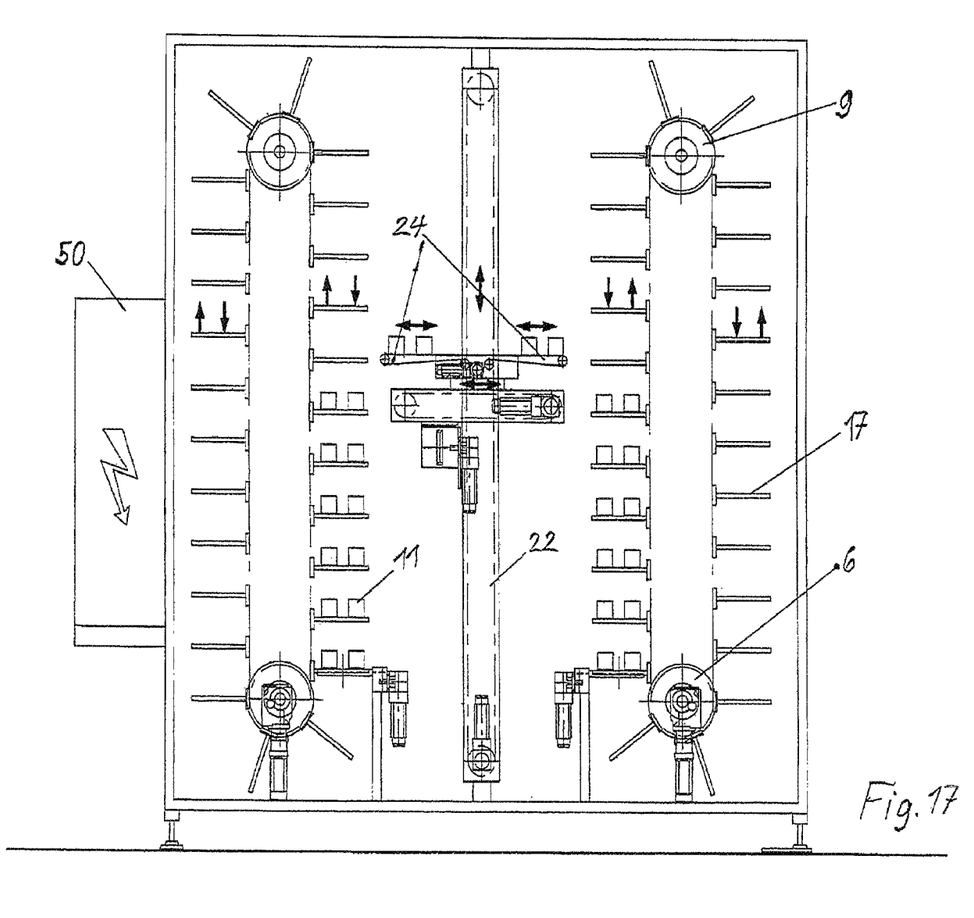

In a further embodiment variant shown in FIGS. 7-9, the inlet end conveyors and the outlet end conveyors inside the buffer are designed as fix-positioned roller conveyors, wherein the rollers are overhung. As such, product holders 17 designed as racks can hoist a product group situated on the inlet roller conveyor vertically from the bottom upward, through the stationary rollers, and stock the same.

A vertical hoisting device 18 is also arranged inside the buffer for the required product transfer from the inlet end chain loop to the outlet end chain loop. It is additionally equipped with a servo-motor-driven horizontal axle 19. On this horizontal axle there is a product holder 20 which can move transversely to the conveying direction. This product holder is also designed as a rack. A product group can be removed from the product holder (rack) of the inlet end chain loop and transferred into the corresponding product holder (rack) of the outlet end chain loop by means of this rack. This product transfer inside the buffer can occur simultaneously for the purpose of buffering incoming and outgoing products, and has no effect which reduces throughput.

A further embodiment of the invention is illustrated in FIGS. 10-13. This buffer has the same fundamental construction as that shown in FIGS. 7-9, but with the difference that the storage device is connected into two parallel product lines. In this embodiment as well, the inlet end conveyors and the outlet end conveyors are designed as fix-positioned roller conveyors inside the buffer, wherein the rollers are overhung. Product holders 17 designed as racks can hoist product groups situated on the inlet roller conveyor vertically from the bottom upward, through the stationary rollers, and stock the same.

In this embodiment as well, a vertical hoisting device 22 is included for the required product transfer from the inlet end chain loops to the outlet end chain loops. It is arranged centrally between the two lines, and, as described in the preceding embodiment, is additionally equipped with a servo-motor-driven horizontal axle. On this horizontal axle, there are two product holders 23 which can move transversely to the conveying direction, wherein one product line is assigned to each of the same. These product holders are also designed as racks. Product groups can be removed from the product holders (racks) of the two inlet end chain loops and transferred into the corresponding product holders (racks) of the outlet end chain loop by means of these racks. This product transfer inside the buffer can also occur simultaneously for the purpose of buffering incoming and outgoing products, and has no effect which reduces throughput.

A further embodiment of the invention is illustrated in FIGS. 14-17. This buffer is similar in construction to that shown in FIGS. 10-13, but with the difference that the product holders 24 which can move transversely to the conveying direction are designed as multi-strand belt conveyors, and in addition to the removal function on both ends, can also transfer products transversely to the conveying direction from one line to another. This allows variable charging and variable allocation between the lines.

FIGS. 18-23 schematically illustrate the different transfer options with the various embodiments described.

Figure 18:
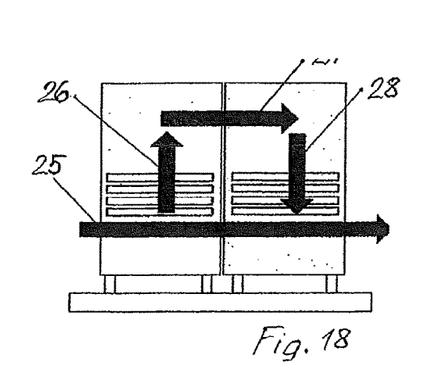

FIG. 18 shows the primary conveying direction 25 in a side view, and the temporary storage upwards with the inlet end upward movement 26 after the product holders have been loaded, the conveyance 27 to the outlet end, and the outlet end downward movement 28 to the discharge plane, as described for the first embodiment.

Figure 19:
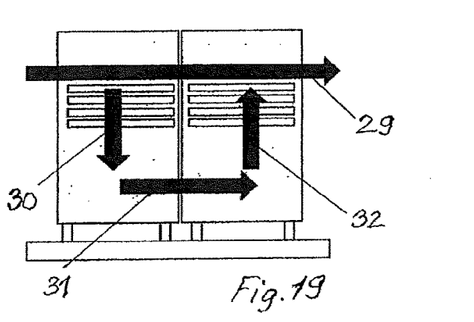

In the alternative shown in FIG. 19, the temporary storage from the primary conveying plane 29 takes place downwards—that is, the inlet end product holders are removed vertically out of the primary conveying plane in a downward movement 30 after being loaded, then the product conveyance 31 to the outlet end and the outlet end upward movement 32 to the primary conveying plane occurs.

Figure 20:
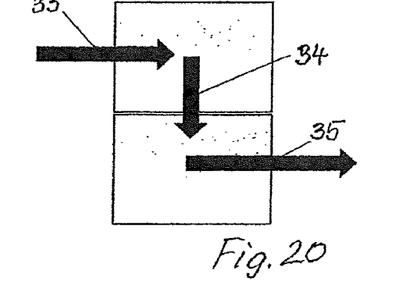

FIG. 20 shows, in plan view, the possibility of transferring an incoming product stream 33 as a whole transverse to the product stream into an axially offset outlet direction 35 by means of the transfer 34 shown in the embodiment of FIGS. 14-17.

Figure 21:
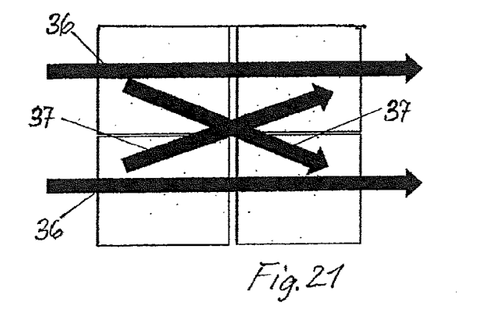

FIG. 21 shows, in plan view, the possibility of both continuous product streams 36 and a transverse transfer 37 between the product streams.

Figure 22:
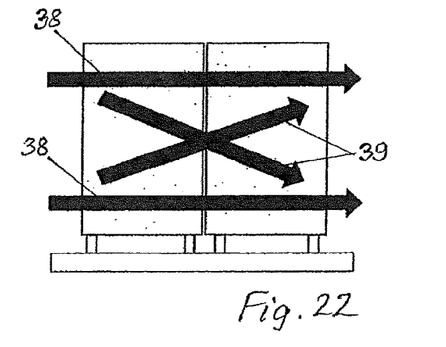

FIG. 22 shows, in side view, the additional possibility of carrying out, in addition to the continuous product streams 38, a vertical transfer 39 between different planes of product holders.

Figure 23:
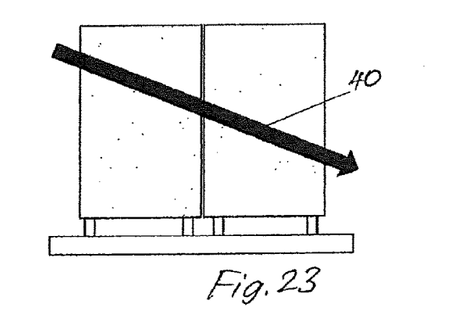

FIG. 23 schematically shows the basic possibility of a vertical transfer 40 in a buffer device according to the invention.

Figure 24:
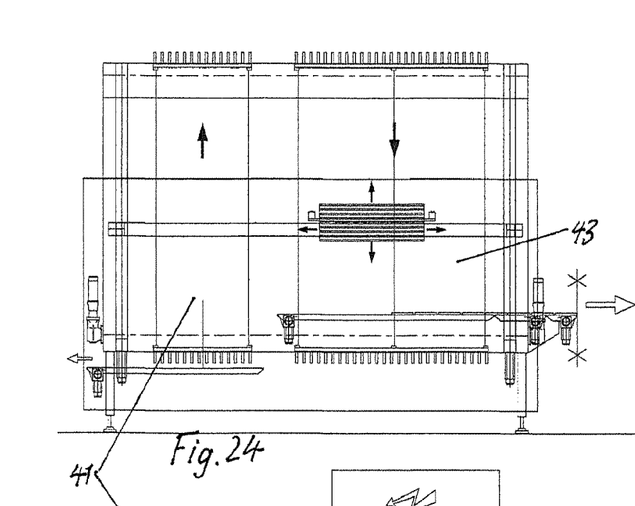
FIGS. 24-30 show further variants.
Figure 25:
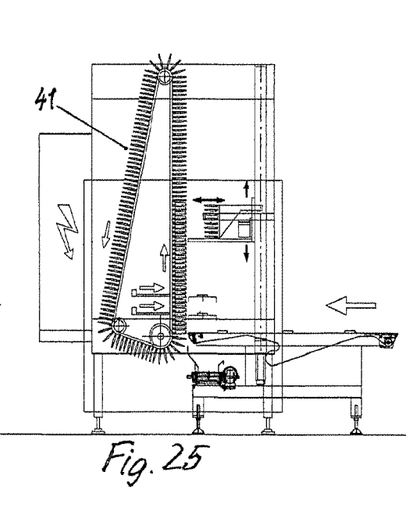
Figure 26:
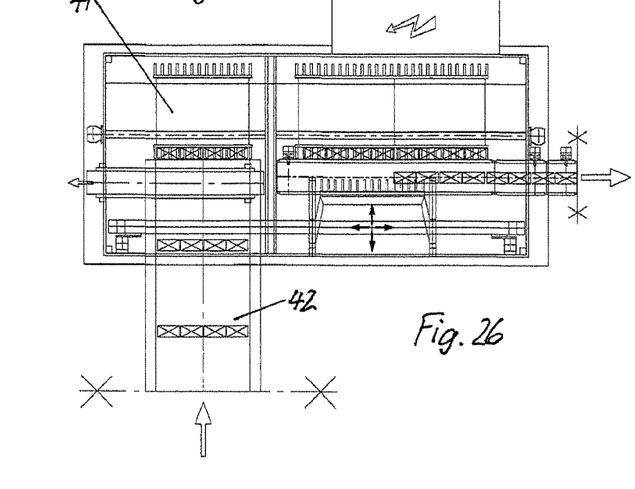

In the embodiment shown in FIGS. 24-26, the inlet end chain loop 41 is loaded frontally with rows of product via an inlet belt 42, while at the outlet end chain loop 43, the discharged products exit from the product flow regulator in the lateral direction.

Figure 27:
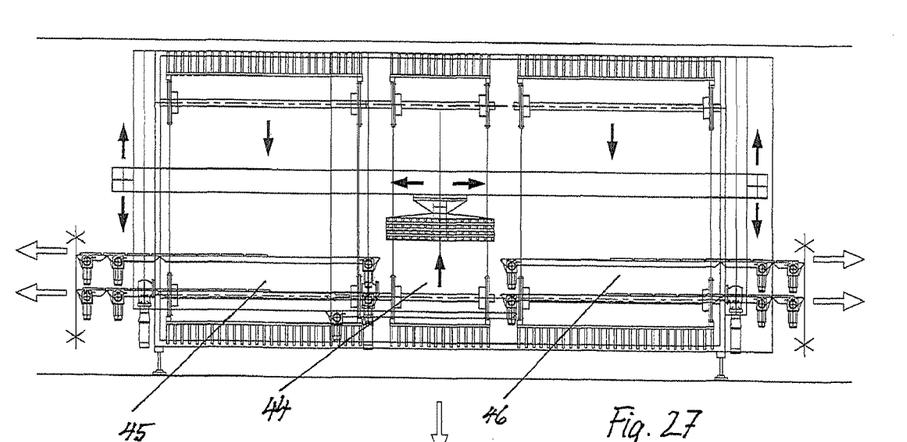
Figure 28:
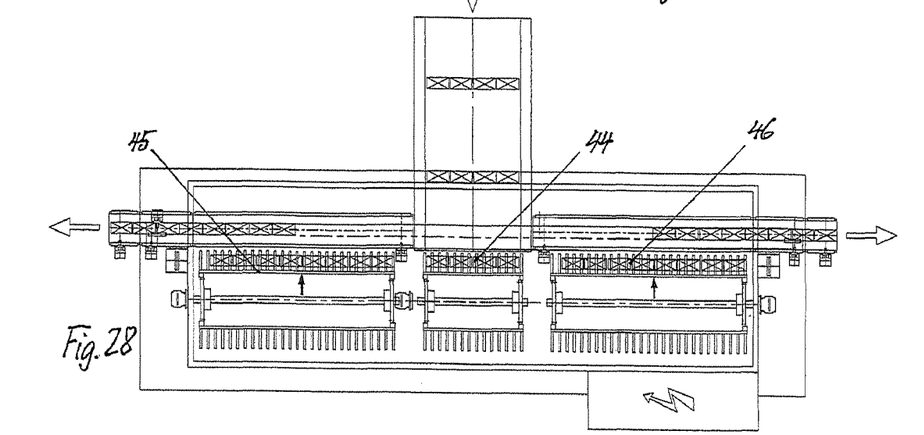

The embodiment shown in FIGS. 27-28 is a product flow regulator having a centrally arranged upward-moving inlet chain loop 44, which is loaded frontally with rows of product, as well as two downward-moving outlet end chain loops 45, 46 arranged on both sides, wherein the discharged products exit from the product flow regulator in the lateral direction.

Figure 29:
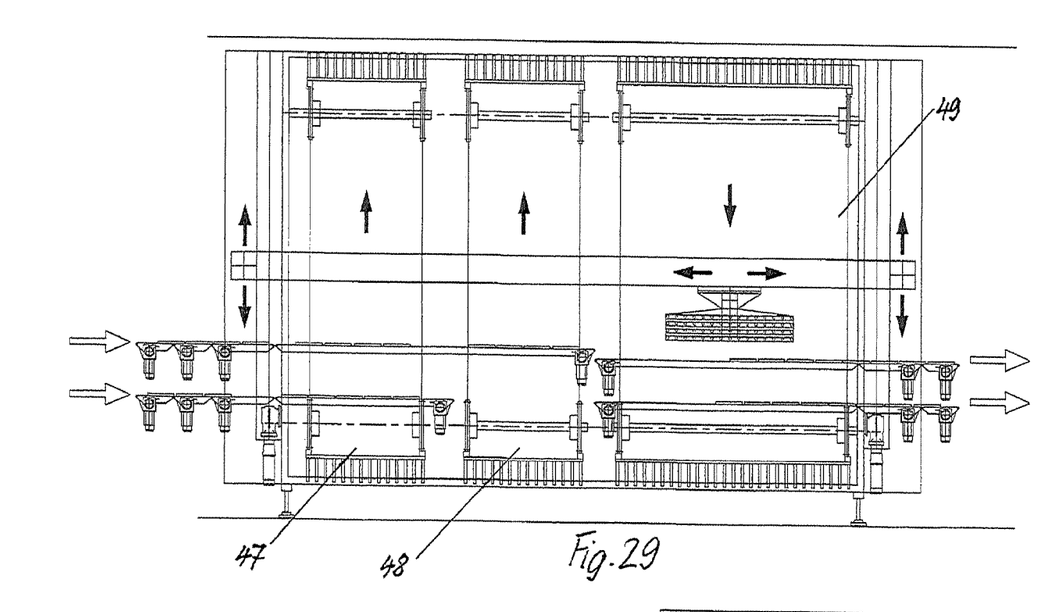
Figure 30:
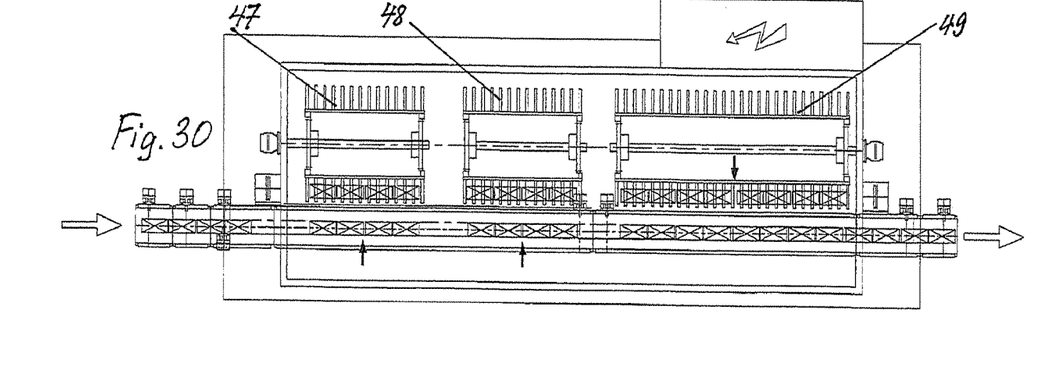

The embodiment shown in FIGS. 29-30 is a product flow regulator with two adjacently arranged upward-moving inlet chain loops 47, 48, wherein each of the two chain loops is loaded separately with products fed from the lateral direction. In the case of the downward-moving outlet end chain loop 49 of the same type, the discharged products exit in the lateral direction from the product flow regulator.

A control box 50 situated externally on the buffer frame furnishes all the necessary means for the control, such that the necessary functions and capabilities for the product handling can be implemented.

The invention claimed is:

1. A buffer device for temporary storage and flow control in a product conveyor system, comprising:
    a plurality of vertically movable product holders at an inlet end of the buffer device and an outlet end of the buffer device, and
    an elevator system to place the plurality of vertically movable product holders in a conveying plane of the product conveyor system and vertically moving the plurality of vertically movable product holders, wherein
    the elevator system comprises a chain loop at the inlet end of the buffer device and a chain loop at the outlet end of the buffer device, equipped all around with the plurality of vertically movable product holders, and wherein the two chain loops are movable in opposite directions, and
    the plurality of vertically movable product holders are constructed as conveyors.

2. The buffer device according to claim 1, wherein fix-positioned drive devices which drive the plurality of vertically movable product holders are situated in the conveying plane.

3. The buffer device according to claim 1, further comprising a centrally arranged and vertically movable drive device implements product transfer inside the buffer device.

4. The buffer device according to claim 3, wherein the centrally arranged and vertically movable drive device comprises a coupling that provides centering and positive torque transmission.

5. The buffer device according to claim 1, wherein the plurality of vertically movable product holders at the inlet end of the buffer device and the outlet end of the buffer device are respectively inlet and outlet conveyors that are each designed as stationary roller tracks with overhung rollers.

6. The buffer device according to claim 5, wherein the plurality of vertically movable product holders are designed as racks.

7. The buffer device according to claim 6, further comprising another rack which is movable in three dimensions, and which performs product transfer inside the buffer device.

8. The buffer device according to claim 6, further comprising a multi-strand belt conveyor which is movable in three dimensions, which performs product transfer inside the buffer device and also allows a variable allocation of products between product lines.

9. The buffer device according to claim 1, wherein a plurality of chain loops equipped with the plurality of vertically movable product holders are arranged on the inlet end of the buffer device or on the outlet end of the buffer device.

10. The buffer device according to claim 1, wherein inlet and outlet of product occurs with a relative angular offset.

11. A buffer device for temporary storage and flow control in a product conveyor system, comprising:
- a plurality of vertically movable product holders at an inlet end of the buffer device and an outlet end of the buffer device,
- an elevator system to place the plurality of vertically movable product holders in a conveying plane of the product conveyor system and vertically moving the plurality of vertically movable product holders, and
- a multi-strand belt conveyor which is movable in three dimensions, which performs product transfer inside the buffer device and also allows a variable allocation of products between product lines.

* * * * *